Aug. 11, 1953

C. B. EMERY 2,648,219

TORQUE TESTING DEVICE

Filed April 7, 1950

INVENTOR
C. B. EMERY

BY *E. H. Kane*

ATTORNEY

Aug. 11, 1953  C. B. EMERY  2,648,219
TORQUE TESTING DEVICE
Filed April 7, 1950  2 Sheets-Sheet 2
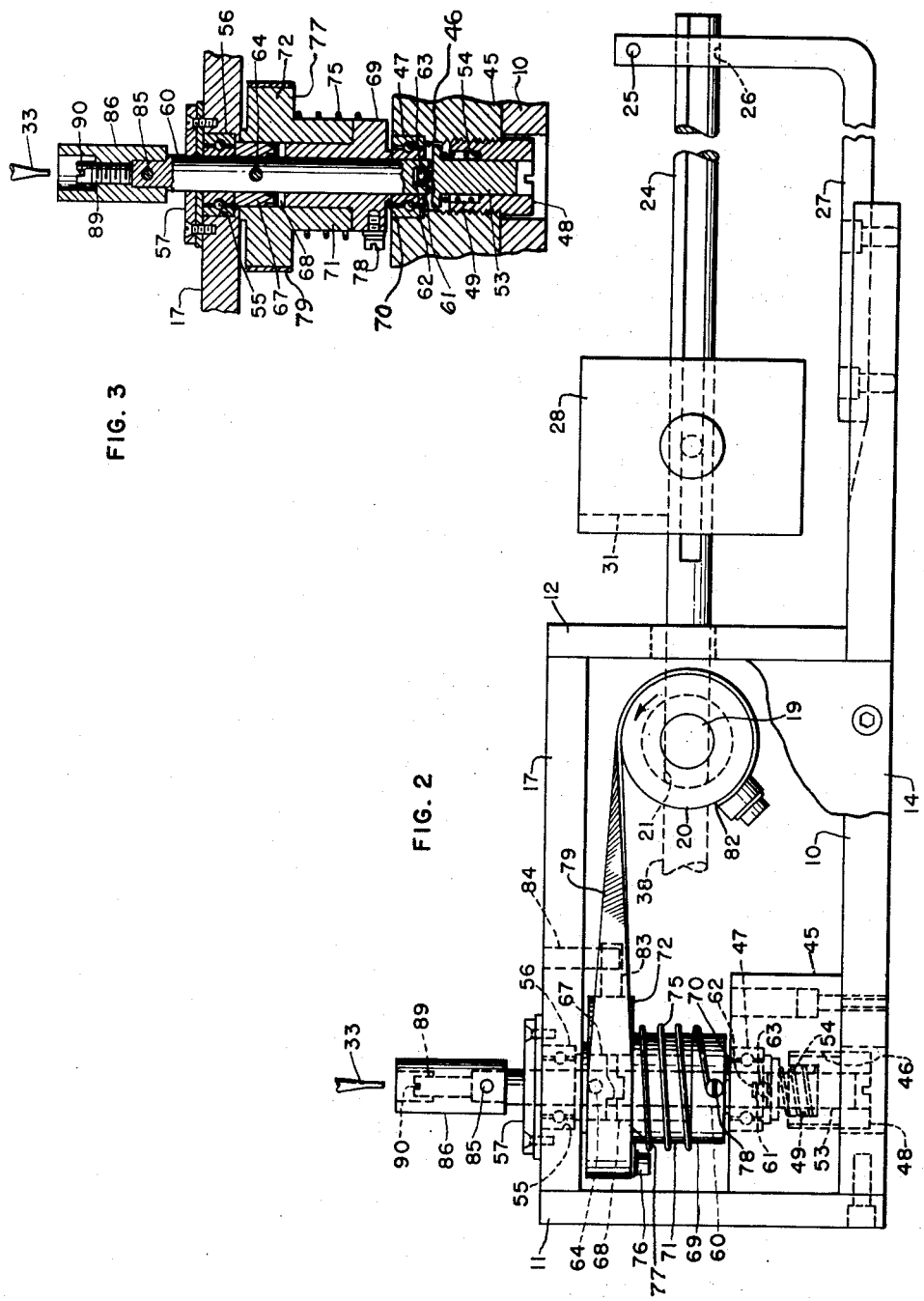
INVENTOR
C. B. EMERY
BY *E. H. Kane*
ATTORNEY Patented Aug. 11, 1953

2,648,219

UNITED STATES PATENT OFFICE 2,648,219

TORQUE TESTING DEVICE

Charles B. Emery, River Forest, Ill., assignor to Western Electric Company, Incorporated, New York, N. Y., a corporation of New York Application April 7, 1950, Serial No. 154,545

8 Claims. (Cl. 73—1)

This invention relates to torque testing devices and more particularly to a gage for determining the output torque of a rotary tool.

The primary object of this invention is to provide a simple and practicable device for efficiently determining output torque of such a tool.

In accordance with the above object, the present invention, in one embodiment thereof as applied to a gage for determining the output torque of a rotary tool, such as a non-slipping or stalling clutch type power driven screw driver, comprises a horizontally pivoted load beam having a scale and an adjustable weight for setting the gage for the desired number of torque pounds for which the tool is to be tested. Movable about the pivoted axis of the beam is a drum, which is interconnected to a second drum by a metallic ribbon, opposite ends of which are fixed to the drum. The second drum is resiliently connected to a driven clutch member coaxial therewith and upon a rotary tool being operatively associated with a yieldable member carrying a driving clutch member, the clutch members are engaged, thereby transmitting motion through the ribbon to the first drum and lifting the weighted beam at its free end. If the beam balances when the rotary tool stalls, the tool is developing the desired torque.

Other objects and advantages of this invention will more fully appear from the following detailed description taken in conjunction with the accompanying drawings, in which:

Fig. 2 is a fragmentary front elevational view of the gage shown in Fig. 1 and illustrating a portion of an air driven screw driver about to be applied thereto for determining its output torque; and Fig. 3 is a vertical section taken on the line 3—3 of Fig. 1.

Figure 1:
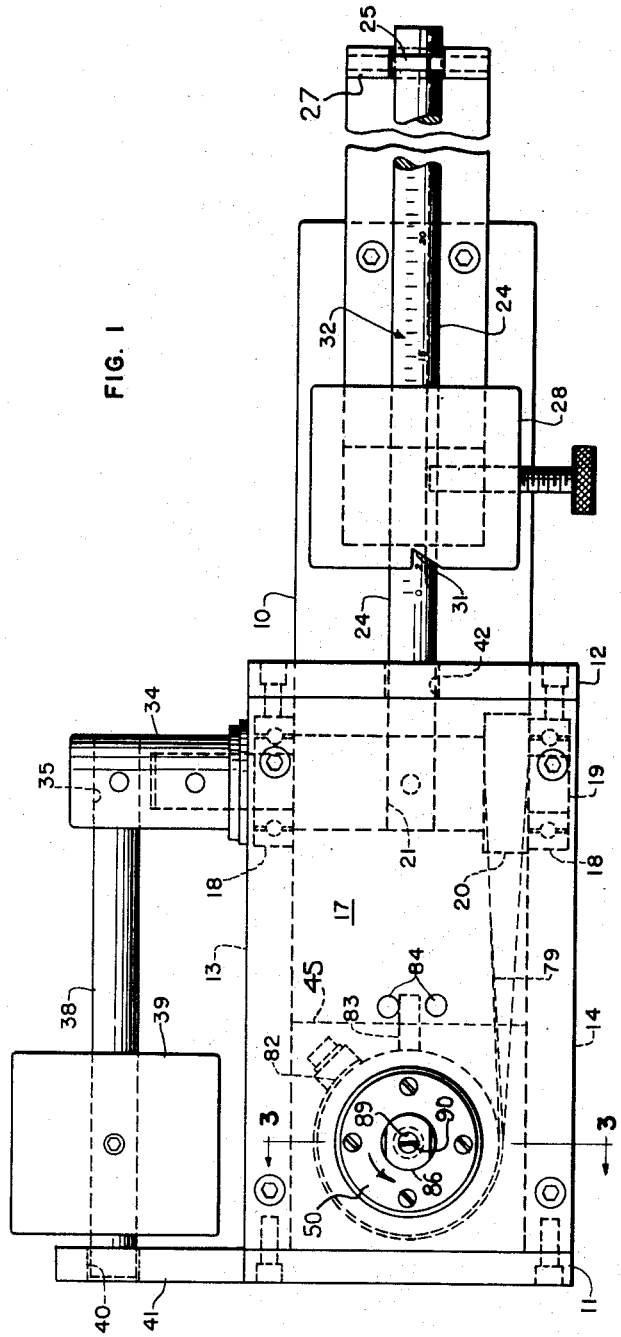
Fig. 1 is a fragmentary plan view of a gage for determining output torque of a rotary tool.

Referring to the drawing in detail, 10 indicates a rectangular shaped base supporting a rectangular shaped box-like structure at its left end comprising opposite end members 11 and 12, opposite side members 13 and 14, and a cover member 17 suitably secured together. In Fig. 2, the side member 14 is fragmentarily shown. Mounted in openings in the side members 13 and 14 are aligned ball bearings 18 (Fig. 1), in which are journalled opposite ends of a shouldered shaft 19 having a drum-like formation 20 at its lower end (Fig. 1) or at its forward end (Fig. 2). Fixed at one end in a radially directed aperture 21 in the shaft 19 is a rod-like load beam 24, which extends to the right, with its free end disposed between an upper stop member 25 and a lower stop surface 26 secured in and formed, respectively, on an upper end of a bifurcated arm 27 secured to the base 10. An adjustable weight 28, slidable on the load beam 24 and having an indicating notch 31 in left end face in cooperation with a scale 32 inscribed on the load beam is used in setting the gage for the desired number of torque pounds and/or fractions thereof, for which a rotary tool, in the present instance an air driven screw driver 33, is to be tested.

The upper end of the shaft 19, as viewed in Fig. 1, has fixed thereto a surrounding sleeve 34 having at its outer end a radially directed aperture 35 in which is fixed one end of a rod 38, which carries an adjustable slidable counterweight 39, the opposite end of the rod extending into an aperture 40 in a lug 41 formed on the end member 11. The counterweight 39 is so adjusted on the rod 38 that when the weight 28 has been set along the beam 24 for testing, the beam will rest at its right end (Fig. 2) in its normal horizontal position against the lower stop surface 26. The load beam 24 also extends through an aperture 42 in the end member 12, the apertures 40 and 42 being of such dimensions that the rod 38 and load beam 24 may freely rock without interference about the axis of the shaft 19 during a gaging operation.

Secured upon the base 10, at its left end (Fig. 2), and to the end member 11 and side members 13 and 14, is a rectangular shaped block 45 having a shouldered bore 46. A ball bearing 47 is mounted in the upper end of the bore 46 and threaded into the lower end of the bore is a plug 48, having a shouldered aperture 49 therein. Slidably fitted in the smaller diameter of the plug aperture 49 is a flanged pin 53. Surrounding the smaller diameter of the pin 53 is a coiled compression spring 54, having its opposite ends engaging a bottom annular wall of the larger diameter of the plug aperture 49 and the lower surface of the flange on the pin. The pin 53, which thus is longitudinally yieldably carried in the plug 48 and normally pressed upwardly by the spring 54, serves as a yieldable pad, and its effect may be adjusted by manipulating the plug 48. Fitted in a larger diameter of a shouldered aperture 55 in the cover member 17 and in axial alignment with the lower ball bearing 47 is an upper ball bearing 56, which is maintained in the aperture by a collar 57 fixed to the cover member. Longitudinally slidable and rotatably fitted at opposite ends in the ball bearings 47 and 56 is a rod 60, which, at its lower end, is provided with an axial depression 61, in which is fitted a ball race 62, against the lower surface of which bears a single ball 63, which also engages the upper surface of the flange on the yieldable pad 53.

Pinned, as indicated at 64, to the rod 60 between its ends is a toothed driving clutch member 67, which is normally declutched from a cooperating driven recessed clutch member 68, which is freely rotatable upon the longitudinally slidable and rotatable rod 60. At its lower end, the driven clutch member 68 is provided with a circular enlargement 69, which is formed with a circular collar-like formation 70, the lower face of which rests upon the inner race of the ball bearing 47. The clutch members 67 and 68 are normally declutched, as shown in Figs. 2 and 3, due to the expanding normal action of the spring 54 raising the rod 60 carrying the driving clutch member 67 to its upper unclutched position.

Freely fitted to turn or oscillate on the smaller diameter of the driven clutch member 68 is a shouldered collar 71 having a drum-like formation 72 at its upper end. Resiliently interconnecting the vertical drum 72 and the driven clutch member 68 is a right-hand coiled torsion spring 75, having one end fixed, as indicated at 76, to a lower annular face 77 of the drum 72 and having its opposite end, as indicated at 78, fixed to the peripheral surface of the enlargement 69 of the driven clutch member 68. The horizontal drum 20 and the vertical drum 72 are interconnected by a flexible metallic ribbon 79, arranged as shown in Fig. 2, and having its ends fixed to the drums, as indicated at 82 (Figs. 1 and 2). Thus, the drum 72 is caused to turn in the direction of the arrow (Fig. 1) when the driven clutch member 68 is rotated through the resilient drive provided by the interconnecting spring 75. Consequently, the driving action to be transmitted by the driven clutch member 68 to the drum 72 and thence through the ribbon 79 to the drum 20 and to the lead beam 24 is cushioned so that an abrupt sudden lifting of the beam does not occur. Oscillatory movement of the drum 72 is limited by a pin 83, which extends radially from the drum 72 between two suitably spaced stop pins 84—84 depending from the cover member 17.

To the upper reduced end of the vertically slidable and rotatable rod 60 is fixed, as indicated at 85, a shouldered sleeve 86. Threaded into the bore of the sleeve 86 is a socket member 89, with which a rotary tool which is to be checked for developed torque is engaged. In the present embodiment of the invention, the socket member 89 is provided with a slot 90 for receiving the tang 33, shown fragmentarily, of a power driven screw driver. In checking developed torque of other types of rotary tools, for instance, a nut driving tool, another sleeve 86 equipped with a suitable socket member for receiving the driving end of the latter tool may be used.

Before using the above-described testing device, the weights 28 and 39 are set along the load beam 24 and rod 38, respectively, for the particular rotary tool which is to be tested for its output torque. When the weights have been correctly set for the numbers of torque pounds and/or fractions thereof, the free end of the load beam 24 should be resting upon the stop surface 26. In the present embodiment of the invention, the rotary tool to be tested for its output torque is an air driven screwdriver of the non-slipping or stalling clutch type, the tang of which is shown fragmentarily at 33.

Thereafter, the rotating screwdriver tang 33 is operatively associated with the slot 90 of the socket member 89 and pressed downwardly (Figs. 2 and 3) to carry the driving clutch member 67 into clutched relation with the driven clutch member 68 against the action of the spring-pressed pad 53. The driven clutch member 68 will thus be rotated in the direction of the arrow (Fig. 1) and through the resilient connection provided by the torsion spring 75 will drive the drum 72 without an abrupt starting action, and such turning movement of the drum is arrested by the pin 83 abutting the lower of the two stop pins 84—84 (Fig. 1). When the clutch members 67 and 68 are in clutched relation, the lower surface of the flange on the pad 53 is abutting the upper annular surface of the adjustable plug 48, thus limiting the downward thrust of the screwdriver tang 33. The turning movement of the drum 72 is immediately transmitted to the drum 20, which will turn in the direction of the arrow (Fig. 2) by the flexible metallic ribbon 79 to cause the load beam 24 to be lifted at its free right end (Fig. 2). By observation, the operator notes whether the load beam 24 is balanced between the upper stop member 25 and the lower stop surface 26, in which case the tool is developing the desired torque. In case the load beam is lifted sufficiently to rest against the stop member 25, the developed torque is too great and, if the load beam fails to rise from the stop surface 26, not enough torque is being put out by the tool.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A gage for testing output torque of a rotary tool comprising a base, an adjustable balance beam having a weight adjustably carried thereon, means on said base for mounting said balance beam for rocking movement about a substantially horizontal axis, an oscillatable member, a socket member for receiving the rotary tool and effecting a driving connection therewith, means on said base mounting said oscillatable member and said socket member for arcuate movement about a substantially vertical axis, means for effecting a driving connection between the socket member and the oscillatable member, and motion transmitting means interconnecting said oscillatable member and said beam to cause the movement of said beam in response to actuation of said oscillatable member.

2. A torque testing gage comprising a base, an adjustable balance beam mounted on said base for rocking movement about a substantially horizontal axis, said beam having a weight adjustably carried thereon, an oscillatable member, a socket member for receiving a rotary tool to be tested to effect a driving connection therewith, means on said base mounting said oscillatable member and said socket member for movement about a substantially vertical axis, means including a yieldable member for establishing a driving connection between the socket member and the oscillatable member and to cushion the initial movement of said oscillatable member, and means interconnecting said oscillatable member and said beam to cause the movement of said beam in response to the actuation of said oscillatable member.

3. A gage for testing output torque of a rotary tool comprising a base, a balance beam having a weight adjustably carried thereon, means on said base mounting said balance beam for rocking movement about a substantially horizontal axis, an oscillatable member, a rotatable socket member for receiving the rotary tool to effect a driving connection therewith, means on said base mounting said oscillatable member and said socket member for movement about a substantially vertical axis, said socket member being movable along said axis to and from upper and lower positions and being freely rotatable in said upper position, means yieldably holding said socket member in said upper position, means operable in response to the movement of said socket member to its lower position to effect a driving connection between said socket and said oscillatable member, and motion transmitting means interconnecting said oscillatable member and said beam to cause the movement of said beam in response to the actuation of said oscillatable member.

4. A torque testing gage comprising a base, a balance beam having a weight adjustably mounted thereon, means on said base mounting said balance beam for oscillatable movement about a substantially horizontal axis, an oscillatable member, a socket member for receiving a rotary tool to be tested, means on said base mounting said socket member and said oscillatable member for movement about a substantially vertical axis, said socket being movable along said axis to and from a normal upper position and a lower position and being freely rotatable in said upper position, means including a yieldable element for effecting a yieldable driving connection between said socket and said oscillatable member when said socket member is in its lower position and to cushion the initial movement of said oscillatable member, and a flexible element interconnecting said oscillatable member and said beam to cause movement of said beam in response to movement of said oscillatable member.

5. A torque testing gage comprising a base, a shaft, means on said base mounting said shaft for oscillating movement about a substantially horizontal axis, a balance beam fixed to said shaft and extending radially outwardly from one side thereof in a substantially horizontal position, a weight adjustably carried on said beam, a counter-weighted arm fixed to and extending radially from the opposite side of said shaft, said weight being adjustable on said beam to produce a predetermined unbalanced condition of said beam, an oscillatable member, means mounting said oscillatable member for movement about a substantially vertical axis, a socket member for receiving and effecting a driving connection with a rotary tool to be tested, means mounting said socket member for rotation about substantial vertical axis and for movement along said axis to and from upper and lower positions, said socket member being freely rotatable in said upper position, means including an element for yieldably connecting said socket member to said oscillatable member for movement about said axis when said socket member is moved to its lower position, and means interconnecting said rotary member and said shaft to cause the rocking movement of said shaft and said balance beam in response to the actuation of said oscillatable member.

6. A gage for testing output torque of a rotary tool comprising a base, an adjustably weighted balance beam mounted on said base for rocking movement about a substantially horizontal axis, an oscillatable member mounted for movement on said base about a substantially vertical axis, a connector member for receiving said rotary tool and effecting a driving connection therewith, a driving clutch element connected to said socket member for rotation therewith, a driven clutch member connected to said oscillatable member, means mounting said connector member and the driving clutch element for rotation about said substantially vertical axis and for axial movement along said axis, means yieldably maintaining said clutch elements in separated position, said clutch elements being movable into engagement to effect a driving connection between said connector member and said oscillatable member in response to a downward movement of said connector member by a rotary tool being tested, and means interconnecting the oscillatable member and said beam for rocking said beam in response to the actuation of said oscillatable member.

7. A gage for testing output torque of a rotary tool comprising a base, a shaft having a drum thereon, a balance beam fixed to said shaft and having a weight adjustable thereon, means on said base for supporting said shaft and beam for oscillatable movement about a substantially horizontal axis, an oscillatable member mounted on said base for movement about a substantially vertical axis, a socket member for receiving said rotary tool to effect a driving connection therewith, a driving clutch element on said socket member, means mounting said socket member and said clutch element for rotation about said substantially vertical axis and for axial movement along said axis, a driven clutch element, means mounting said driven clutch element for rotation about said substantially vertical axis and against axial movement, means yieldably connecting the driven clutch member to said oscillatable member to impart movement thereto and to cushion the initial movement of said oscillatable member, means for yieldably maintaining said driving clutch element disengaged from said driven clutch element, said driving clutch element being freely rotatable in said disengaged position and being engageable with said driven clutch element in response to the axial movement imparted to said socket element by said rotary tool, and a flexible element connecting said oscillatable member and said drum for rocking said balance beam in response to the actuation of said oscillatable member.

8. A torque testing gage comprising a base, a shaft having a drum thereon, a balance beam fixed to said shaft and having a weight adjustable thereon, means on said base for supporting said shaft and beam for oscillatable movement about a substantially horizontal axis, a second drum, means on said base mounting said second drum for oscillatable movement about a substantially vertical axis and against axial movement along said axis, a socket member for receiving said rotary tool to effect a driving connection therewith, a driving clutch element connected to said socket member for movement therewith, means mounting said socket member and said clutch element for rotation about said substantially vertical axis and for axial movement along said axis, a driven clutch element, means mounting said driven clutch element for rotation about said substantially vertical axis and against axial movement, means including a resilient element for connecting said second drum for rotation with said driven clutch element, means for yieldably maintaining said driving clutch element disengaged from said driven clutch element, said driving clutch element being engageable with said driven clutch element in response to the axial movement imparted to said socket element by said rotary tool, and a flexible element interconnecting said drums for rocking said balance beam in response to the actuation of said second drum.

CHARLES B. EMERY.

References Cited in the file of this patent
UNITED STATES PATENTS

| Number | Name | Date |
|---|---|---|
| 2,342,919 | Chapman | Feb. 29, 1944 |
| 2,446,039 | Bennett | July 27, 1948 |
| 2,486,632 | Burke et al. | Nov. 1, 1949 |
| 2,503,649 | Zimmerman | Apr. 11, 1950 |